Oct. 6, 1925.

S. E. WINDER ET AL
GLASS MOLDING MACHINE
Filed Oct. 4, 1920

INVENTORS:
Samuel E. Winder
Henry G. Daubenspeck
By E. J. Andrews
Att'y.

Oct. 6, 1925.

S. E. WINDER ET AL

GLASS MOLDING MACHINE

Filed Oct. 4, 1920

INVENTORS:
Samuel E. Winder
Henry C. Daubenspeck

By E. J. Andrews
Att'y.

Patented Oct. 6, 1925.

1,555,897

UNITED STATES PATENT OFFICE.

SAMUEL ESTE WINDER AND HENRY COTTON DAUBENSPECK, OF LONDON, ENGLAND.

GLASS-MOLDING MACHINE.

Application filed October 4, 1920. Serial No. 414,622.

*To all whom it may concern:*

Be it known that we, SAMUEL E. WINDER and HENRY C. DAUBENSPECK, citizens of the United States, residing at present at "Greygates" Kidbrook Gardens, Blackheath, London, S. E., England, have invented certain new and useful Improvements in Glass-Molding Machines, of which the following is a specification.

This invention relates to glass molding machines, and particularly to machines which are adapted to mold glass tumblers and the like.

One of the objects of the machine is to increase the rate at which the tumblers or other articles may be molded into shape. A further object is to improve the quality of the molded article. A further object is to produce a machine for the purpose which will be more dependable and less likely to become inaccurate, particularly in reference to the registering of the various parts. Further objects of the invention will be apparent from a consideration of the accompanying drawings and the following description thereof:

In general the machine which we have chosen to illustrate our invention comprises feeding mechanism for delivering molten glass in a proper manner to the molds of the molding machine, the inner surface of the molds corresponding to the outer surfaces of the tumblers to be molded; mechanism for transmitting the molds; a plunger, the outer surface of which corresponds to the inner surface of the tumbler to be molded; mechanism for forcing the plunger downwardly into the molds in successive order; mechanism for suitably removing the tumblers from the molds when they are sufficiently cooled; and other incidental mechanism has been provided for various purposes.

Figure 1:
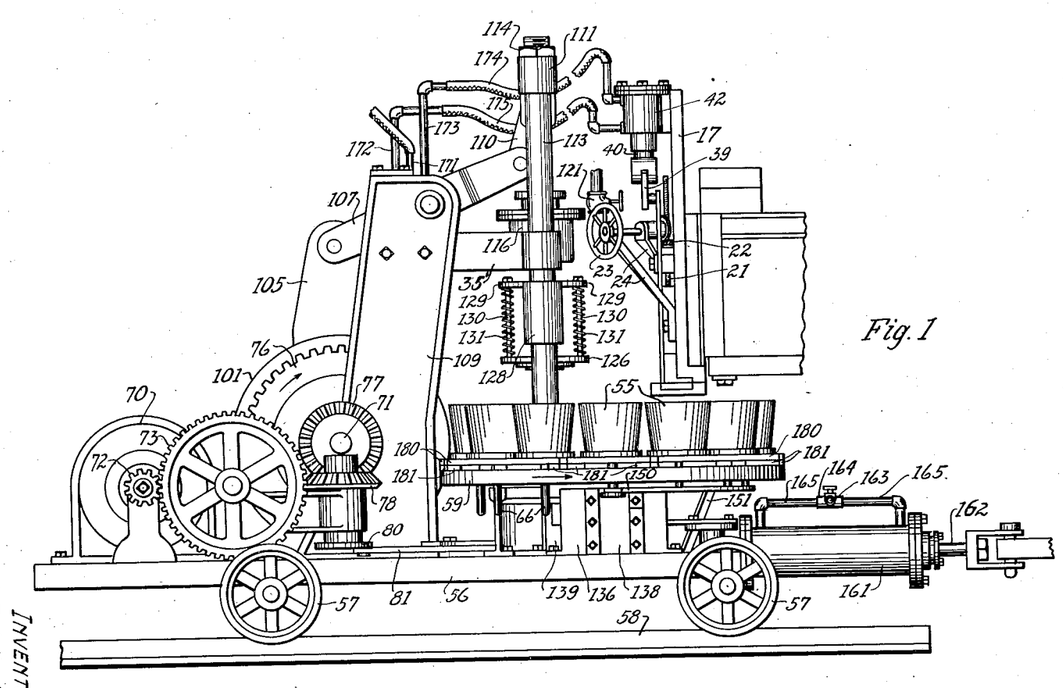
Figure 1 is a side elevation of a machine which embodies features of my invention.
Figure 2:
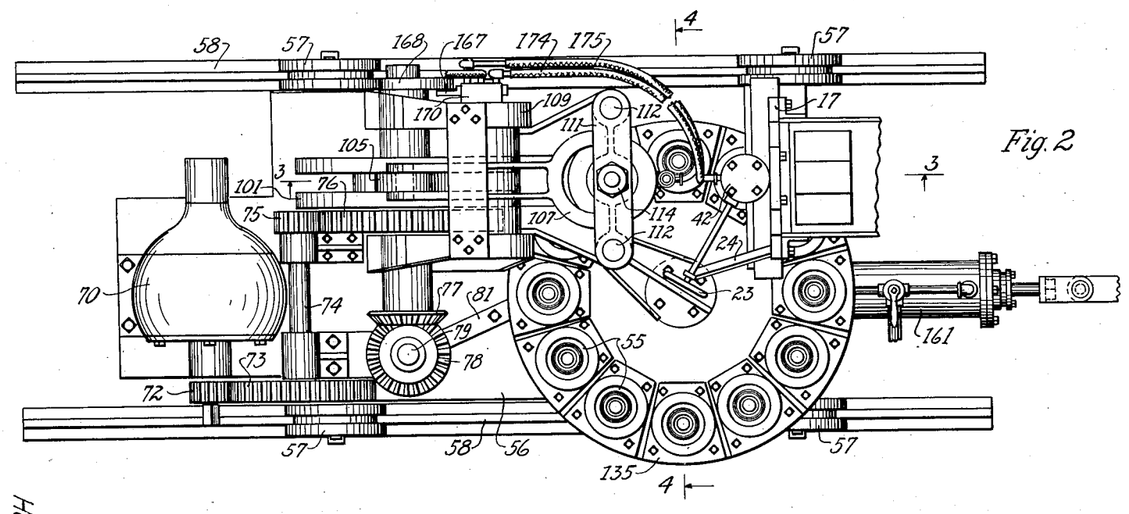
Fig. 2 is a plan view of the machine.
Figure 3:
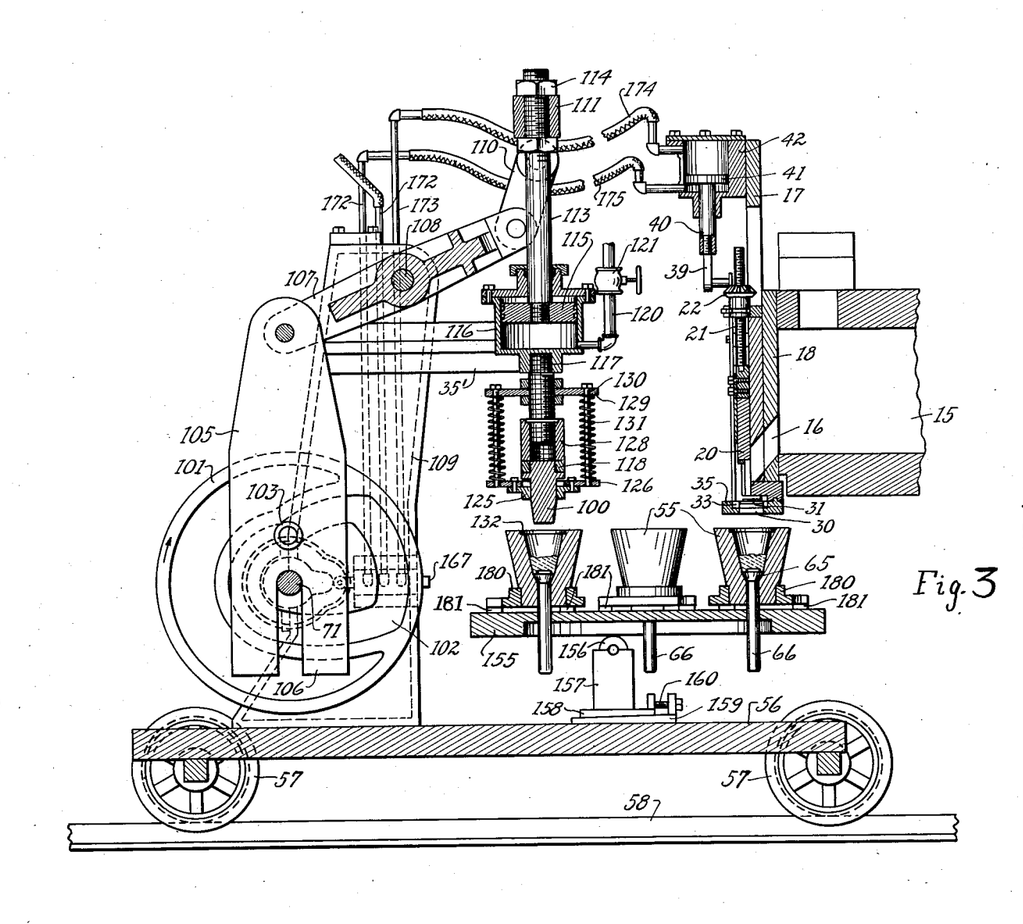
Fig. 3 is a sectional elevation of the machine along the lines 3—3 of Fig. 2.
Figure 4:
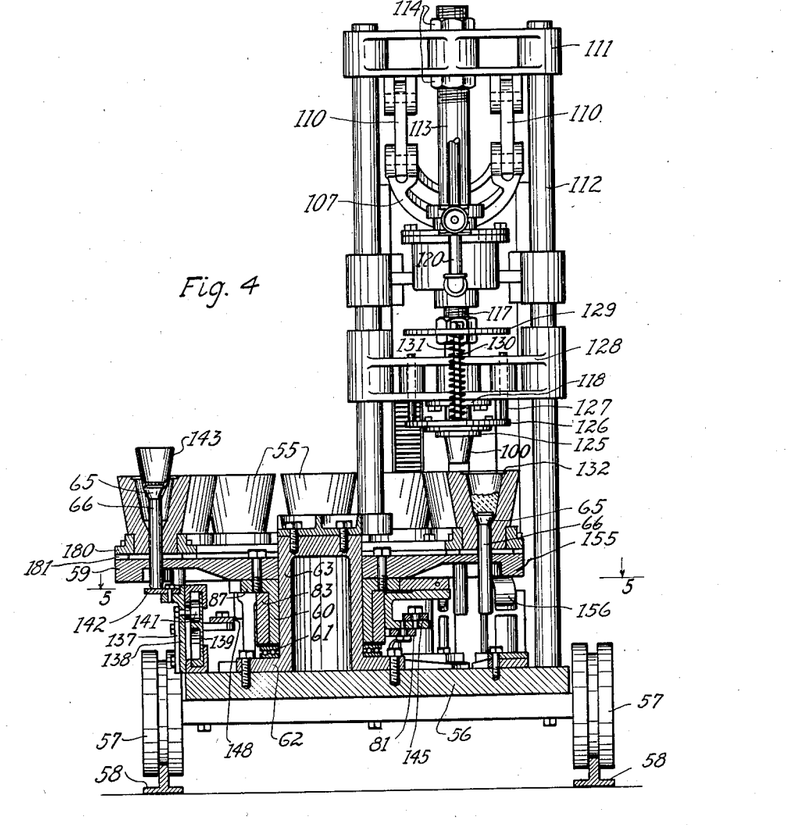
Fig. 4 is a section along the line 4—4 of Fig. 2.
Figures 5, 6, 9, 10:
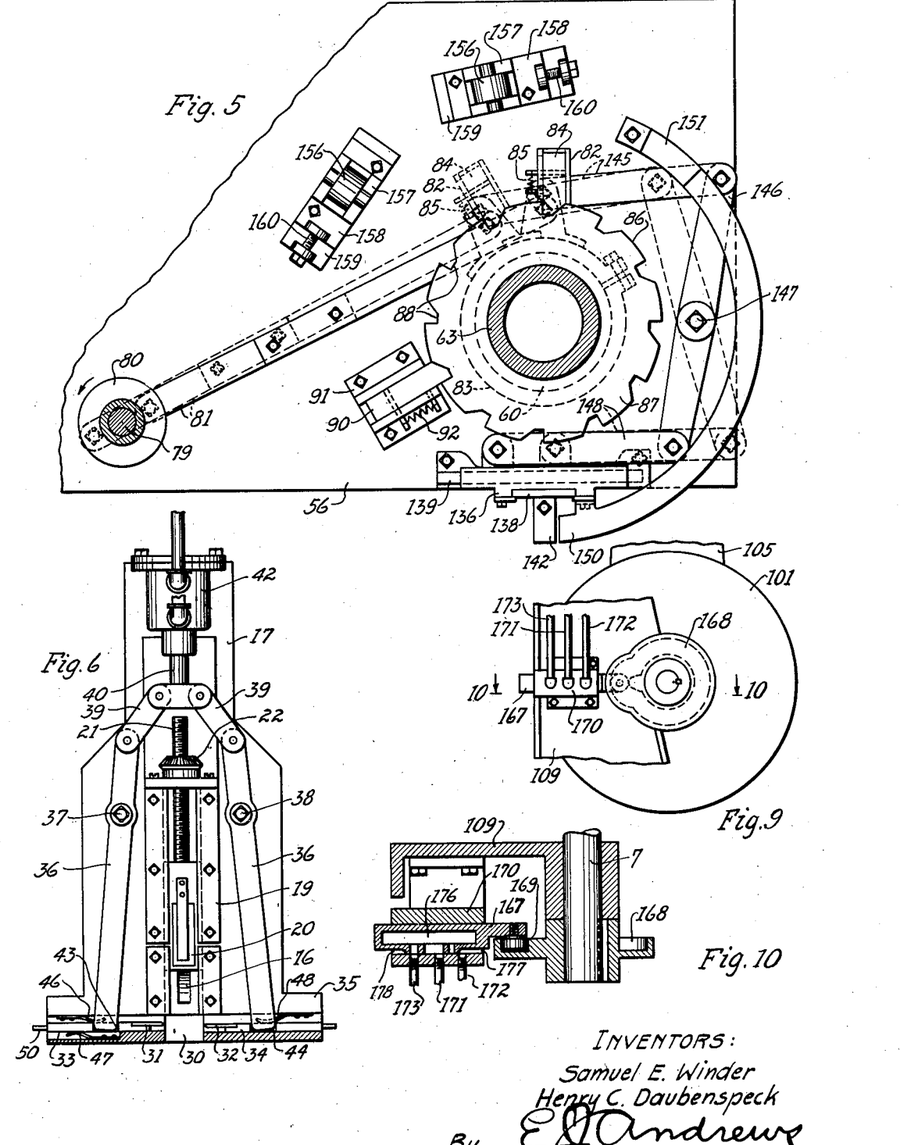
Fig. 5 is an enlarged fragmental section along the line 5—5 of Fig. 4.
Fig. 6 is an elevation of the mechanism for feeding the molten material to the machine.
Fig. 9 is a fragmental view showing the valve mechanism for operating the feeding mechanism.
Fig. 10 is a section on the line 10—10 of Fig. 9.

The molding machine shown in Figs. 1, 2, and 3, is used in connection with any suitable form of glass furnace provided with a conduit 15 for conveying the molten glass to the feeding mechanism illustrated in Fig. 6. The feeding mechanism comprises a framework of any suitable form, such as the frame 17, which is fixed, in any suitable manner, to the end of the walls of the conduit 15, adjacent to the clay plate 18, which partly closes the end of the conduit, and through which is formed the outlet 16. Fixed to the frame 17, are guides 19, which allow a gate 20 to be slidably mounted in front of the outlet 16, so that the magnitude of the outlet may be varied by varying the position of the gate. In order to suitably control the position of the gate, we provide a screw 21, which is connected at its lower end to the gate. The upper end of the screw is threaded into a bevel-gear 22 rotatably mounted in the frame; and this gear may be rotated by means of a hand wheel 23 journaled in brackets 24, fixed to the frame.

In operation, the molten mass of glass flows downwardly through the inclined outlet 16, which opens outwardly through the vertical end of the conduit. The molten mass then flows downwardly through the opening 30 in the lower portion of the feeding mechanism. At the proper time the plastic mass of glass passing through this lower opening is cut off by knives in the following manner: The knives 31 and 32 are fixed in any suitable manner to holders 33 and 34 respectively. The holders are slidably mounted in the base 35 of the frame of the feeding mechanism, and are operatively connected with the driving mechanism in such a manner that, at the proper time, the knives will be moved toward each other against the stream flowing downwardly through the opening 30, and will meet at the central portion thereof and will thus disconnect the proper amount of the molten material from the flowing mass.

The mechanism for operating the knives comprises levers 36 pivoted to the frame at the points 37 and 38. The lower ends of these levers pass into recesses 43 and 44 in the knife holders, and the upper ends of the levers are connected by links 39 to a piston rod 40. The piston rod is operated by means of a piston 41, in the cylinder 42. Any suitable means may be used for supplying compressed air or other gas to the cylinder 42 at the proper time. The means which I have used for this purpose are fully described hereinafter. When it is desired to operate the knives, compressed air is allowed to enter the upper end of the cylinder, and the downward movement of the piston resulting therefrom, by means of the links 39, forces outwardly the upper ends of the levers 36 and thus forces the knives inwardly.

Figure 7:
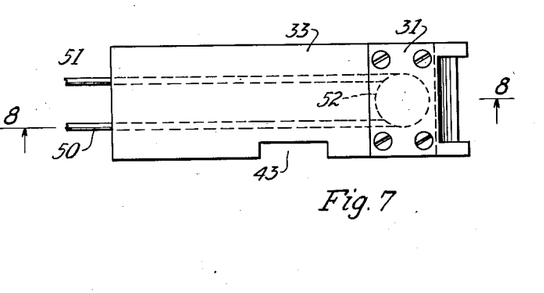
Fig. 7 is an enlarged plan view of one of the knives used in the mechanism for feeding the molten material.
Figure 8:
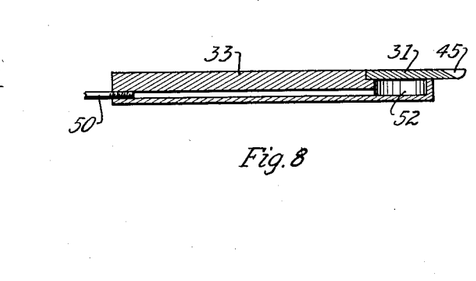
Fig. 8 is a section along the lines 8—8 of Fig. 7.

The knives are so placed that the knife 31 passes over the knife 32; a projection 45, Fig. 8, with a beveled or rounded surface, being fixed to each knife, so as to properly guide the knives in their movement with reference to each other. Springs 46, 47, and 48 are fixed to the frame and tend to force the knives more closely together when they come in contact so as to produce a sharp cutting edge. In order to properly cool the knives, I have provided conduits 50 and 51, which are suitably connected to a source of water supply under pressure and to a suitable outlet for the water; so that water is continuously passing into the conduit 50 to a chamber 52 beneath the knife and out through the discharge conduit 51 (Fig. 7).

The molding machine receives the molten material from the feeding mechanism. The molding machine is mounted upon a truck comprising a floor 56, mounted on wheels 57, which run on T rails 58. Rotatably mounted on the floor of the truck is a mold table 59, the table being supported by a hub 60 rotatably mounted on ball-bearings 61 supported by the flange 62 of the center column 63.

When a suitable amount of molten material has been discharged from the feeding mechanism, the material is received by a mold 55, which, at the proper time, is positioned about one inch below the opening 30. The molds 55, of which there are twelve, are supported by the table 59 and intermittently rotated thereby.

The following mechanism is provided for intermittently rotating the table, and hence the molds: so as to transmit the molds from the receiving to the molding position and from the molding position to the ejecting position: Any suitable driving means may be used for the purpose. In this instance I have shown an electric motor 70, supported on the floor of the trucks. The motor operates the main shaft 71, by means of the intermediate gear-wheels 72 and 73, shaft 74, and gear-wheels 75 and 76. Fixed to the shaft 71 is a bevel-gear 77 which meshes with a bevel-gear 78 fixed to the shaft 79.

Fixed to the lower end of the shaft 79 is a crank 80, to which is pivotally connected a connecting bar 81. As the motor is operated, it is evident that, by means of this mechanism, the connecting bar 81 will be oscillated back and forth. This bar is pivoted to a bracket 82, fixed to a collar 83, which surrounds the hub 60, supporting the table 59. Slidably mounted in the bracket 82 is a pawl 84, which is yieldingly held, by means of a spring 85, against the periphery 86 of the flange 87 of the hub 60. Cut in the periphery of this flange are twelve equally spaced notches 88 forming a pawl rack of the flange 87. The hub, and hence the table is thus rotated by means of the pawl 84 as the bar 81 is oscillated. The length of the crank 80 is such that for each rotation of the shaft 79, the table is rotated through one-twelfth of a complete rotation or one notch of the pawl rack. In order to hold the table firmly in position when the movement thereof has been completed, a pin 90, slidably mounted in a frame 91 fixed to the truck, is adapted to pass into a notch 88 of the rack, and is held firmly in place by means of the spring 92.

By these means suitable intermittent motion is given to the table, and hence, to the molds, and the molten material, when deposited in a mold, is transmitted away from the receiving position, and is properly positioned under a plunger 100, which is arranged to mold the material into shape. The molding position of the mold with reference to the receiving position is one-sixth of a rotation of the table. The mold containing the molten material is first removed from the receiving position by one-twelfth of a rotation of the table and it is there allowed to stand for a brief space of time in order to allow the material to settle properly in the mold. It is then transmitted by one-twelfth of a rotation of the table to the molding position, as is indicated by Fig. 3.

The mechanism for molding the glass, in addition to the molds, comprises the plunger 100 and means for suitably pressing the plunger into the molten mass in the mold, so as to force the glass outwardly and upwardly between the mold and the plunger in order to produce the shape desired. The means for operating the plunger consists of the following: Fixed to the main driving shaft 71 is a pair of cam disks 101, having cam paths 102, in which are positioned the cam rollers 103, journaled to a beam 105. The lower end of the beam 105 is held in position by means of a slot 106 through which passes the main driving shaft 71; the upper end of the beam is pivotally connected to the walking beam 107 pivoted at 108 to the housing 109, which is fixed to the floor of the trucks; the other end of the walking beam is connected by connecting links 110 to the cross-bar 111 slidably mounted on guide posts 112, which are supported by the frame of the machine by means of the supports 35', Fig. 1.

It will be seen that, by means of this mechanism, as the motor rotates, thus rotating the main driving shaft 71 and the cam disks 101, the walking beam 107 will be oscillated by means of the vertical beam 105, and the cross-head 111 will be reciprocated vertically on the guide posts 112. Fixed to the cross head 111 is a piston rod 113 having a thread at its upper end so that, by means of the nuts 114, its position with reference to the cross-head may be adjusted. By means of the rod 113, and other intermediate mechanism hereinafter described, as the cross-head moves downwardly it carries with it the plunger 100 and forces it into the molten mass contained in the mold, which, at this time, is positioned immediately beneath the plunger and axially alined therewith. The beam 105 is of sufficient weight to substantially balance the weight of the cross-head and plunger mechanism.

In practice, it has been found impossible to supply at all times uniform masses of the molten material, and it becomes necessary to provide means whereby the material will receive suitable pressure under varying quantities of material in the mold. The maximum pressure in all cases should be substantially the same even though the mass of molten glass materially varies. We prefer to have the maximum pressure when the molding is being completed substantially sixty pounds per square inch. Evidently if the plunger were rigidly fixed to the cross-head in each case the plunger would be moved downwardly exactly the same distance, so that if the amount of material were greater in one case than in another, the pressure thereon would become greater or means would need to be provided for removing some of the material. We have, therefore, found it desirable to provide means for varying slightly the position of the plunger at the end of the downward stroke, without varying the maximum pressure thereon so as to compensate for varying masses of molten material, and at the same time maintaining the maximum pressure for an appreciable length of time, so as to allow the plastic material to properly set in form; and the means which we have provided for these purposes comprises the following:

Fixed to the lower end of the rod 113, is a piston 115, contained in a cylinder 116. The cylinder 116, by means of the rod 117, is fixed to the cross-head 128 and the plunger 100 is threaded into a plate 118 also fixed to the cross-head. Hence, the connection between the plunger and the rod 113, is not rigid, but includes the piston 115 and the cylinder 116. Any suitable fluid may be introduced into the cylinder 116 beneath the piston. We prefer for the purpose compressed air, which may be supplied from any suitable source, such as a storage tank, having, in this particular instance, the constant pressure of substantially 30 pounds per square inch. In the pipe 120 which delivers the compressed air from the source to the cylinder 116, we provide some adjustable restricting means, such as the valve 121; so that, when the piston 115 is forced downwardly into the cylinder 116, the air contained in the cylinder will be at liberty to pass back to the source through the restricting means 121; but the rate of passage thereof will depend upon the degree of restriction in the pipe. As a consequence, when the plunger is forced downwardly into the mold, the pressure will cause relative movement of the piston and cylinder and the air will be forced from the cylinder back through the pipe 120; but, because of the restriction, the pressure in the cylinder will be increased to an amount depending upon the degree of restriction. The pressure will rise to a certain maximum amount, beyond which it will not go because, as the downward movement of the rod 113 is substantially constant, the air in the cylinder will escape at a constant rate when the maximum pressure is reached. By suitably adjusting the restriction and the pressure of the compressed air in the storage tank, the maximum pressure may be suitably predetermined at any desired amount.

In order to more properly complete the molding process, we provide a ring 125, encircling the plunger 100 and fixed to the plate 126. This plate is in turn fixed to pins 127, slidably mounted in the cross-bar 128 which is slidably supported by the posts 112. Fixed to the bar 117, is a plate 129; and rods 130, fixed to the plate 126, pass freely through openings in the plate 129; and springs 131 encircle the rods and are compressed between the plates 126 and 129. As the rod 117 is forced downwardly, it in turn forces downwardly, by means of the springs 131, the plate 126, and the plunger ring 125 fixed thereto. The ring, before the plunger reaches its lowest position, is seated on the ring seat 132 and is pressed firmly thereon by means of the springs 131, so that the glass is prevented from passing out from the mold, and the upper edge of the glass is pressed into suitable shape. As a consequence of this, it will be seen that any surplus amount of glass is retained in the mold, and the necessity arises for some constant pressure means, such as hereinabove described, acting on the plunger.

The instant the pressure on the glass reaches a certain predetermined amount, depending upon the material and the form of the vessel being molded, the pressure must be neither increased nor decreased for an appreciable length of time, as too great a pressure, or a reduction in pressure before the material had properly set, would produce an inferior article.

After the ring reaches its seat, the plunger continues to move downwardly a slight distance, and, as a consequence, when the plunger is forced upwardly, the ring 125 encircling the plunger moves downwardly with reference to the plunger and overcomes thus any tendency of the glass to adhere to the plunger. Suitable ordinary means, not shown, are used for keeping the plunger at the proper temperature.

When the molding of the tumbler has been completed, a little time is required for it to cool so as to be sufficiently hard to handle. We, therefore, intermittently move the mold from the molding position to position 135, where the ejector removes the glass from the mold. The ejector comprises the valve 65 with the valve stem 66 and means for elevating the valve and stem at the proper time. These means are not material to the present invention, but are fully described in our Patent No. 1,331,792, issued Feb. 24, 1920, to which this application is similar.

We also provide means for supporting the edge of the table 59 under the molding mechanism as follows: A flange 155 projects downwardly from the periphery of the table. Under this flange, and positioned each side of the plunger mechanism, are rollers 156 supported by brackets 157, resting on wedges 158 and 159 supported by the floor of the trucks. By means of screws 160, relative movement of the wedges may be produced so as to vary the elevation of the rollers 156 and bring them snugly against the lower surface of the flange 155, thus firmly supporting the edge of the table in the neighborhood of the molding mechanism at all times.

The mechanism has been described as supported upon trucks, although other suitable supporting means may be used. In this instance, we have shown and described trucks, for the reason that it is sometimes desirable to move the molding mechanism away from the feeding mechanism in order to have more convenient access to certain portions of the mechanism, or for other reasons. For this reason, we have provided also means for conveniently moving the trucks, which comprise a cylinder 161 fixed to the trucks and having therein a piston fixed to the piston rod 162, which is fixed rigidly to any suitable structure, such as the framework of the glass furnace. Connected to the source of supply of compressed air is a pipe 163, and connected to this pipe is an ordinary three-way valve 164, and pipes 165 lead therefrom to the ends of the cylinder. By suitably operating the valve, the trucks will be forced forwardly or backwardly, as the case may be; and when the piston is forced inwardly, so as to bring the machine into proper operating position, it will be firmly held in such position by means of the compressed air.

The means for operating the knives of the feeding mechanism comprises a valve 167, Figs. 9 and 10; the valve casing 170 which is fixed to the housing 190; a cam 168, fixed to the shaft 71; and a roller 169 rotatably mounted on the valve and operatively connecting the valve with the cam. Connecting the valve with a source of compressed air is a pipe 171, which at all times allows the compressed air to pass freely into the valve chamber 176. This chamber provides a supply of compressed air in the valve so that the action of the air is accelerated. Connecting the valve with the respective ends of the cylinder 42 are pipes 172, 173, 174, and 175. When the valve is in the position shown in Fig. 10 compressed air passes freely from the chamber 176 into the upper end of the cylinder, and the lower end of the cylinder is free to exhaust its air through pipe 172 and the exhaust port 177. As a consequence, the piston 41 is then forced down and the knives are closed. When closed the knives lap about three-eighths of an inch, so that a complete smooth cut is made. When, as the shaft rotates, the roller approaches the annular portion of the cam, the valve allows air to pass into the lower end of the cylinder and to exhaust from the upper end through port 178, and the knives are opened.

The complete operation of the machine is as follows: As the plunger 100 approaches its highest position, air begins to enter the upper end of the cylinder 42 to close the knives and just as the plunger reaches its highest position, as indicated in Fig. 3, the valve 167 reaches the full knife closing position, Fig. 10, and the lower portion of the stream of outflowing molten material passing into the mold beneath is instantly severed by the knives and sinks into the mold. At this same instant, the link 81, being in the position shown in Fig. 5, begins to rotate the mold table, and the mold containing the severed mass is moved to the next position. Although the knives are instantly returned to their normal positions, yet the outflowing stream, relieved of the downward pull of the severed mass, is retarded in its motion slightly allowing the next mold to pass under without striking the lower end of the stream. Thus the flow is continuous and the operation is as rapid as the nature of the mass will allow.

The mold is at rest under the opening 30 just long enough to properly receive the severed mass; it is then rotated to its position intermediate the receiving and the molding positions, and from this position it passes under the plunger. As the mold passes from the feeding mechanism to the molding mechanism the molten mass settles properly in the mold, ejecting any entrained air and cools to the most suitable temperature for molding. The plunger is then depressed into the mass and the tumbler formed. At the same time, plate 142 is raised and the tumbler five steps ahead of the plunger is ejected, having had sufficient time to cool properly after being molded. Thus the receiving of the mass in the mold, the molding of a tumbler, and the ejecting of another tumbler occur simultaneously, the knives closing just as the plunger rises to its highest point, and opening just as the molds begin to move. Hence no time is wasted and a complete step requires only about two seconds. The complete operation of the knives requires not over one-fourth of a second, so that the knives offer no appreciable hindrance to the flow.

In the machines commonly used in practice for molding molten material into tumblers, cups are used into which the material passes from the outlet of the supply, and, when a sufficient quantity has accumulated, it is allowed to pass downwardly into the molds. This is frequently brought about by having a slidable bottom to the cup, which is removed at the proper time. When mechanism of this nature is used, it has been found that various disadvantages result: More time is required in order to allow the accumulation in the cup, as the molten material is not passing downwardly from the outlet in a substantially continuous stream and the distance from the outlet to the mold is necessarily materially greater than with our mechanism. As a consequence, the rate of operation is reduced, and the material becomes cooled to an undesirable extent. Also the weight of the material below the outlet, particularly as it passes into the mold from the cup, causes it to stretch the flowing mass into a small stream, so that as it passes into the mold it is stringy, and more or less air is entrained in the mass in the mold some of which is held there until the molding process is completed. As a consequence of this, what are called laps are formed in the completed tumblers due to the surfaces of the molten mass becoming so cool that they do not properly weld together; and blisters are formed due to the entrained air. Also shear marks are formed in the tumblers, due to the special manner in which the molten stream is severed. As the false bottom of the cup acting as a cutter is passed under the cup, the edge of the cutter forces the molten mass to one side of the cup, leaving a sharp corner on the mass, which is not afterward sufficiently heated to cause it to weld properly with the other material.

By the use of the means which we have provided and hereinabove described, the rate of operation of the machine is materially increased, and the laps, blisters, and shear marks in the tumblers are materially reduced or entirely eliminated. As the molten mass is free to pass downwardly from the outlet directly into the mold, the distance from the outlet to the mold is materially reduced. In practice, this distance is less than one-half the distance with ordinary machines; being reduced some four inches by eliminating the cup hereinabove referred to. As a consequence, time is saved, and the stretching of the stream, due to the weight of the molten material, is very materially reduced, and the material passes into the mold in a large stream that not only substantially excludes all the air, but also maintains the temperature of the surfaces so high that the welding is perfect and laps are prevented. Also as no air of consequence is entrained, blisters are eliminated. At the same time, the instantaneous severing of the stream, and the cutting inwardly of the two knives from opposite sides of the streams, leaves no cool edge on one side of the mass, so that the shear mark is eliminated.

From what has been said, it is evident that the speed of operation by the use of our machine may be greatly accelerated in practice. Machines ordinarily in use produce some fifteen tumblers per minute, while with the machine we have provided, we are able to produce thirty tumblers per minute. This, together with the elimination of the disadvantages hereinabove referred to, results by carrying on the entire process while the condition of the molten mass is most suitable. The mass is passed from the outlet to the mold in the most expeditious manner; the distance being as short as possible; the stream being as large as is practicable, and the delay caused by the knives being reduced to a minimum.

It has been found in practice that the mold tables ordinarily in use expand and contract to such an extent as to cause inaccurate registering of the plunger and mold, and also, frequently, warping of the tables more or less. In order to avoid this, a part of our invention consists in placing a flange 155 around the periphery of the table 59, which acts not only as a stiffener for the table, but as a radiator therefor, so that the temperature of the table is materially reduced, and is maintained much more constant. This flange is made large, and hence, gives a large cross-section which assists in distributing the heat rapidly throughout the entire flange and the table, and also gives a large radiating surface, so that the amount of heat radiated is materially increased.

As a further means for preventing the disadvantages found ordinarily in practice with reference to this table, we have materially increased the thickness of the table inside of the mold openings, thus giving similarly increased radiating surface, increased cross-section for conducting the heat inwardly, and increased stiffening means. To further diminish the disadvantages arising from the over-heating of the table, we have mounted the molds on plates 180, supported by legs 181 which remove the molds a material distance away from the table, and, therefore, materially reduces the cross-section through which the heat must pass to the table, thus assisting in reducing the temperature of the table, as in practice it is desirable not only to keep the table as cool as possible but also to keep the molds as hot as is possible by the ordinary operation of the machine.

Although we have described with considerable particularity the various details of the structure which we have selected to illustrate our invention, yet changes therein may be made by those familiar with the art without departing from the scope of our invention as disclosed by the following claims.

We claim as our invention:

1. In a glass-working machine, the combination with a series of molds and means for bringing the same successively into pressing position, a pressing plunger adapted to cooperate successively with said molds, a reciprocating cross-head, a cylinder-and-piston connection between the cross head and plunger, and means for supplying light compressible fluid pressure exceeding atmospheric between the cylinder and piston.

2. In a glass-working machine, a pressing plunger comprising a reciprocating carrying head, a pressing member carried thereby, a cylinder carried by said carrying head, a reciprocating operating head, a piston carried by said operating head and fitted within the cylinder, means for suspending the weight of the carrying head on the operating head permitting relative axial displacement between the piston and cylinder, and means for supplying light compressible fluid pressure exceeding atmospheric to the space between the piston and cylinder.

3. In a glass-working machine, the combination with a series of molds and means for bringing the same successively into pressing position, a pressing plunger adapted to cooperate successively with said molds, a reciprocating cross head, a cylinder-and-piston connection between the cross head and plunger, means for supplying fluid pressure between the cylinder and piston, and means in the fluid pressure supply means for checking backflow, whereby a pressure greater than the supply pressure may be intermittently built up and reduced.

4. In a glass-working machine, a pressing plunger comprising a reciprocating carrying head, a pressing member carried thereby, a cylinder carried by said carrying head, a reciprocating operating head, a piston carried by said operating head and fitted within the cylinder, means for suspending the weight of the carrying head on the operating head permitting relative axial displacement between the piston and cylinder, means for supplying fluid pressure to the space between the piston and cylinder, and means in the fluid pressure supply means for checking backflow, whereby a pressure greater than the supply pressure may be intermittently built up and reduced.

5. In a glass molding machine, a plurality of molds, means for bringing the said molds successively into the molding position, a plunger adapted to cooperate successively with said molds, a reciprocating driving member, a coacting cylinder and piston connection between the said member and plunger, means for supplying compressed air into said cylinder, a material restriction in said air supplying means, a mold ring encircling and slidably mounted on said plunger, and resilient means resisting relative movement of said plunger and ring.

6. In a glass working machine, the combination with a mold, of a pressure plunger adapted to co-operate with said mold, reciprocating means, means comprising a cylinder and piston connection operatively connecting said reciprocating means and said plunger, means for supplying fluid pressure between the cylinder and piston, and adjustable means in said fluid pressure supplying means for checking back flow from said cylinder, whereby an adjustable pressure greater than the supply pressure may be intermittently built up.

In testimony whereof we hereunto set our hands.

SAMUEL ESTE WINDER.
HENRY COTTON DAUBENSPECK.